United States Patent [19]

Döhle et al.

[11] Patent Number: 5,251,265
[45] Date of Patent: Oct. 5, 1993

[54] AUTOMATIC SIGNATURE VERIFICATION

[75] Inventors: Lothar Döhle, Herrenberg; Volker Rudolph, Aidlingen; Werner Ruppert, Schoenaich, all of Fed. Rep. of Germany

[73] Assignee: International Business Machines Corporation, Armonk, N.Y.

[21] Appl. No.: 783,450

[22] Filed: Oct. 25, 1991

[30] Foreign Application Priority Data

Oct. 27, 1990 [DE] Fed. Rep. of Germany ..... 90120620

[51] Int. Cl.$^5$ .......................... G06K 9/00; G06K 9/46
[52] U.S. Cl. ........................................... 382/3; 382/16
[58] Field of Search ................... 382/3, 13, 16, 18, 19, 382/20, 38

[56] References Cited

U.S. PATENT DOCUMENTS

| | | | |
|---|---|---|---|
| 3,165,718 | 1/1965 | Fleisher | 382/18 |
| 4,028,674 | 6/1977 | Chuang | 340/146.3 |
| 4,286,255 | 8/1981 | Siy | 340/146.3 |
| 4,398,177 | 8/1983 | Bernhardt | 382/18 |
| 4,742,556 | 5/1988 | Davis, Jr. et al. | 382/51 |
| 4,789,934 | 12/1988 | Gundersen et al. | 364/419 |
| 4,985,928 | 1/1991 | Campbell et al. | 382/3 |
| 5,042,073 | 8/1991 | Collot et al. | 382/3 |

OTHER PUBLICATIONS

"Computer Detection of Freehand Forgeries", R. N. Nagel et al., IEEE Transactions on Computers, vol. C-26, No. 9, Sep. 1977, pp. 895-905.

IBM Technical Disclosure Bulletin, vol. 25, No. 10, Mar. 1983, J. Kim "Baseline Drift Correction of Handwritten Text".

*Primary Examiner*—Michael T. Razavi
*Assistant Examiner*—David Fox
*Attorney, Agent, or Firm*—Arthur J. Samodovitz

[57] ABSTRACT

A method and apparatus for automatically verifying a signature of an individual is described. The apparatus digitizes an image of the signature and provides a grey scale representation of each pixel. Next, the apparatus determines parameters of this digitized image and compares them to corresponding reference parameter values which were determined from a valid signature. The results of the comparison indicate if the signature to be verified is valid. The parameters include a center of gravity of the pixels within each row and columns of the digitized image, a center of gravity line for the centers of gravity for the rows or columns and the center of gravity for all pixels of the image. Other parameters include the positions of maximum grey scale pixels within each row or column, sums of grey scale values per column or row and the shape of a bow within the signature image.

27 Claims, 7 Drawing Sheets

AUTOMATIC SIGNATURE VERIFICATION

BACKGROUND OF THE INVENTION

The invention relates to a method of automatically verifying a signature of an individual and an apparatus for carrying out this method.

Signature verification is known for example from U.S. Pat. No. 4,495,644 (GB 2 104 698 A) in which a transducer pad is used for capturing the signature. The pressure caused by the individual's pen when signing on this transducer pad produces an analogue voltage which is converted to digital form. The digital values are processed under the control of a microprocessor to determine numerical parameter values each representing a significant feature of the signature. Examples of parameters are "Pen out of or in contact with paper", "Current and previous position of pen", "Pen down, pen up", "Length of signature", "Duration of signature", etc. The parameter values of a signature to be verified are then compared with the parameter values of a reference signature which were calculated and stored earlier. Depending on this comparison it is decided if the signature to be verified is true or false that means if the parameter values of the present signature match with the parameter values of the reference signature.

As a transducer pad is necessary for capturing the signature, the described system cannot be used in connection with signatures which were not written on this mechanical sensor. This has the consequence that the known system cannot verify signatures on cheques or the like which were signed away from the computer for example at home.

Furthermore, the parameters which can be calculated from the captured signature are not very expressive. For that reason, a lot of parameters are necessary to reach a high reliability for the TRUE/FALSE-decision and, as a consequence, the processor time and the need for storage is high.

An object of the invention is to provide a signature verification system which is able to verify any signature irrespective of where or when it was written.

Another object of the invention is to provide a signature verification system with increased reliability but with decreased processor requirements.

SUMMARY OF THE INVENTION

According to the invention these objects are solved by establishing a digitized image of the signature having a number of picture elements and by calculating significant parameter values from this digitized image.

The signature verification system according to the invention is independent of a transducer pad or the like. For that reason, the system is able to verify a signature on a cheque which was signed for example at home.

Furthermore, an image of a signature contains much more information than the captured values of a transducer pad. For example, the resolution of an image with regard to the size of a single picture element and with regard to the possible greyscale-values of the picture elements cannot be deduced from a transducer pad. Further, the number of picture elements of the image is usually very high. Finally, the image contains the signature including its surrounding whereas a transducer pad only creates values of the signature. As a result, the signature verification system according to the invention is able to reach a higher reliability with lower processor requirements.

In an embodiment of the invention the digitized image is established by scanning the signature and digitizing the obtained values. The use of a scanner is a very effective possibility to produce an image with a high number of picture elements and a high resolution.

The digital image can then be aligned with respect to the angle of the signature and can be normalized with respect to the size of the signature. The size of the raster of the image can be reduced. All these measures can be used one after the other or alternatively.

In other embodiments of the invention different possibilities of calculating significant parameters are used.

Significant parameters can be derived from the position of the center-of-gravity of the greyscale-values of the picture elements of a respective column or of a respective row.

A parameter with a high reliability for a TRUE/FALSE-decision is the position of the center-of-gravity of the greyscale-values of all picture elements of the image.

Other parameters are the number of sum values of the greyscale-values of all pixels of a respective column which are greater than an offset sum and the positions of those columns. These parameter values characterize distinct slopes of a signature which only change within a certain tolerance.

Further parameters with a high reliability for a TRUE/FALSE-decision are provided by calculating second order polynomials which describe unique segments of the signature. If the signature verification system according to the invention is used in connection with a banking system for example for validating cheques these parameters ensure that a falsification of a signature is recognized.

A further advantage of the above mentioned signature verification system is that the calculation of the significant parameters represents at the same time an encryption of the signature. Furthermore, the calculation of these parameters provides a tremendous compression of the signature related data. No further compression is needed. This has the consequence that less storage for storing the significant parameters of a signature is necessary and, due to that, the processing time is decreased.

The invention is subsequently described in connection with FIGS. 1 to 8 of the drawings.

DETAILED DESCRIPTION OF THE PREFERRED EMBODIMENTS

Figure 1:
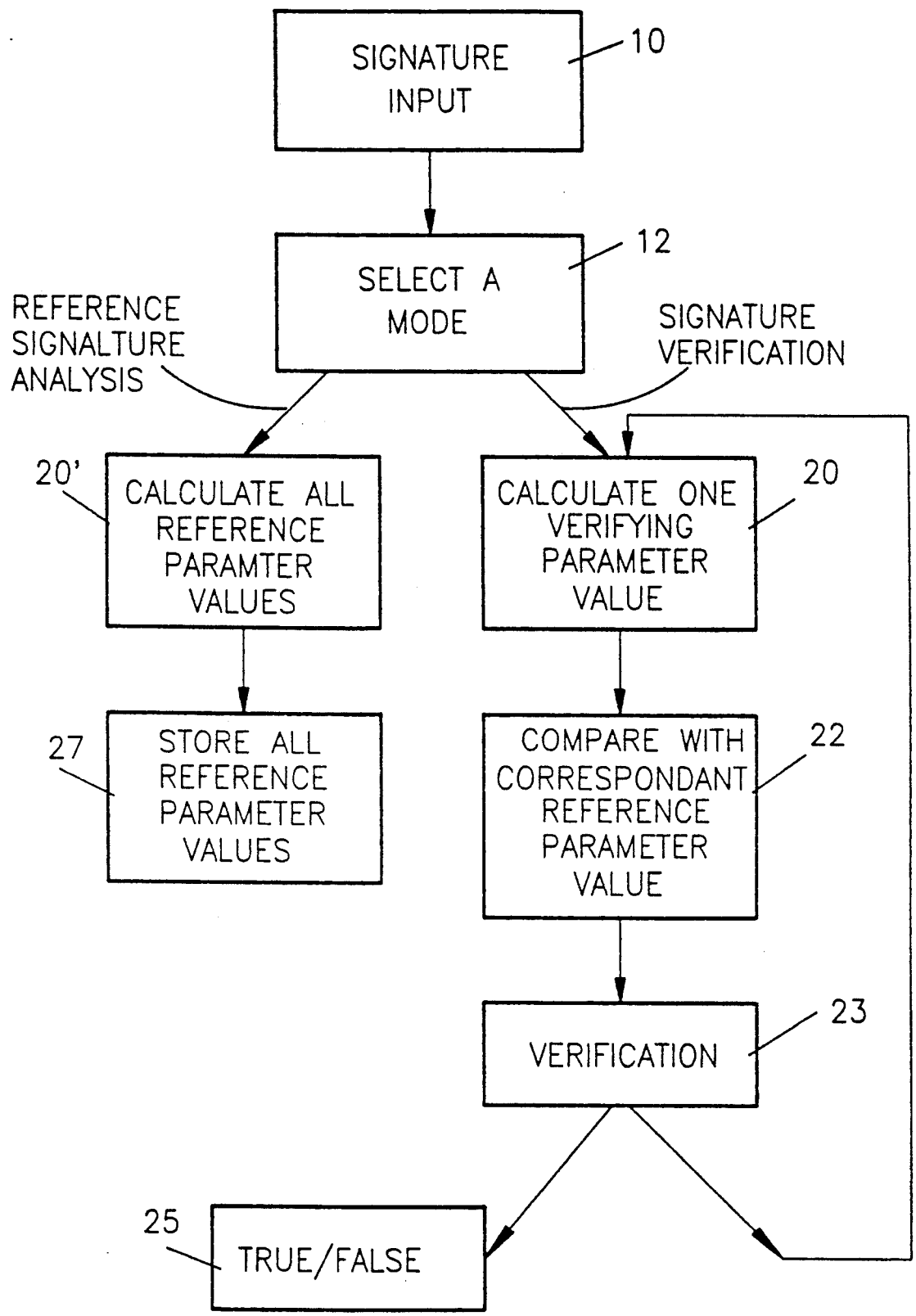
FIG. 1 is a block diagram of the essential steps of the signature verification system according to the invention.

In the block diagram of FIG. 1 a signature input (10) is the first step of a signature verification system. The signature input (10) is-performed by a scanner or the like and establishes a digitized image of a signature as will be described in connection with FIG. 3.

Figure 4A:
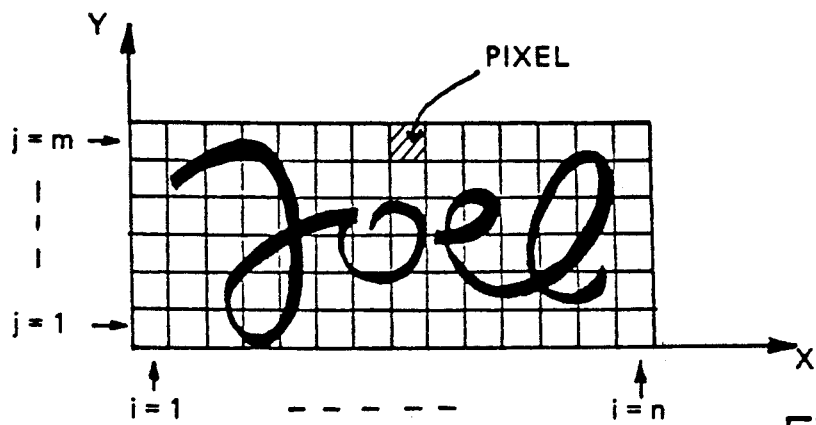
FIGS. 4a to 4c show a signature and one respective diagram per column and per row with the positions of the centers-of-gravity of the greyscale-values of the picture elements of the signature.

The digitized image of the signature contains a number of picture elements (pixels) which form a three dimensional information space. An image of the signature "Joel" is shown in FIG. 4a where the picture elements of the image form a two dimensional array and where the blackness of the picture elements is the third dimension. Depending on the scanner for the signature input (10) the blackness of every picture element is represented by two values (one bit: white or black) or more than two values, for example 256 values (8 bits: white or black or 254 greyscale-values between white and black). These values of the blackness of a picture element (greyscale-values) will be subsequently used as the density of the picture element.

The digitized image of the signature is transferred from the scanner and stored in a computer system for further processing.

After signature input (10) the next step is to select a mode (12). Two modes are possible: a reference signature analysis mode (left side of FIG. 1) and a signature verification mode (right side of FIG. 1). Both, the reference signature analysis mode and the signature verification mode, are performed by the above mentioned computer system by processing digitized images of signatures.

In the reference signature analysis mode one or more reference signatures of an individual are processed for storing sets of reference parameter values. This mode provides the basis for future verifications. In this mode it has to be ensured that the processed signature is the true signature of the individual. No comparisons or verifications are done usually in this mode.

Only if more than one reference signature is available then these reference signatures are compared in order to evaluate the typical reference signature which has the lowest deviations from all other reference signatures.

In the reference signature analysis mode all sets of reference parameter values are calculated (20') in a first step. Then, in a further step, all calculated sets of reference parameter values are stored (27) in a memory of the computer system.

In the signature verification mode one present signature of an individual is processed for creating sets of parameter values to be verified. Depending on the stored sets of reference parameter values and the corresponding sets of parameter values to be verified it is decided if the present signature is true or false with regard to the corresponding reference signature, or in other words if the individual who has written the present signature is identical with the individual who has written the reference signature.

In the signature verification mode one set of parameter values to be verified is calculated (20) in a first step. This set of parameter values to be verified is compared (22) with the stored corresponding set of reference parameter values.

The next step is a verification step (23) in which it is decided if the sets of parameter values to be verified match within given tolerances with the sets of reference parameter values.

In the verification step (23) various statistical methods are used to evaluate if the signature to be verified is true or false. As an example., it is possible to calculate the difference between a set of reference parameter values and a set of parameter values to be verified, and then, depending on the difference, to calculate a standard deviation or a squared failure with regard to the set of parameter values to be verified. These calculated statistical values are then used as probability values of correspondence of the set of reference parameter values and the corresponding set of parameter values to be verified. For example, if the probability value of correspondence is 100%, then there is no deviation between the set of reference parameter values and the set of parameter values to be verified, however, if the probability value of correspondence is 0%, then there is no correspondence at all between these two sets of parameter values.

Furthermore, it is possible to assign the above mentioned probability values with weighting factors in order to give one probability value a greater importance and the other one less importance. These weighting factors can depend on the kind of parameter to which they are assigned or on the individual who is the originator of the signature or on both.

Figure 2:
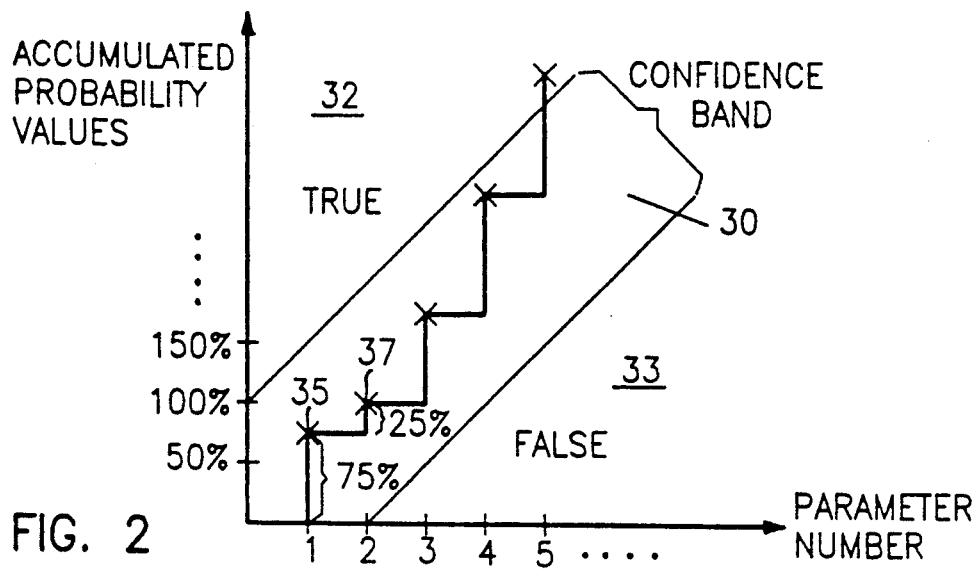
FIG. 2 shows a diagram with a confidence band for use in the verification step of the block diagram of FIG. 1.

The calculated probability values are then used in connection with a confidence band which is shown in FIG. 2 and which will be described now. Of course, all values given in FIG. 2 are examples.

In the diagram of FIG. 2 the abscissa carries the parameter-number and the ordinate the accumulated probability values. The diagram is divided into three parts: a confidence band (30), a TRUE-area (32) and a FALSE-area (33).

The set of parameter values to be verified of a first parameter is calculated and compared with the corresponding set of reference parameter values. Then, depending on the comparison and as described above, a probability value of correspondence is evaluated. This probability value (35) is shown in FIG. 2 at parameter-number 1. Its value is 75% for example and its position is within the confidence band (30). Then, the set of parameter values to be verified of a second parameter is calculated and compared with the corresponding set of reference parameter values. A probability value relating to this second parameter is evaluated and added to the probability value related to the first parameter. This accumulated probability value (37) is shown in FIG. 2 at parameter-number 2. As the probability value relating to the second parameter is 25%, the accumulated probability value is 100% and its position is still within the confidence band (30).

This procedure is repeated until either the accumulated probability value reaches the TRUE-area (32) or falls into the FALSE-area (33). If the result of the verification step (23) is a FALSE-decision (25), then the signature to be verified is rejected. In the other case, if the result of the verification step (23) is a TRUE-decision (25), the signature to be verified is accepted.

If the accumulated probability value always remains in the confidence band (30), no TRUE/FALSE-decision can be made and a (not shown) special procedure has to be started.

As a summary, in the calculating step (20') of the reference signature analysis mode all sets of reference parameter values are calculated, whereas in the calculating step (20) of the signature verification mode only those sets of parameter values to be verified are calculated which are necessary to reach a TRUE/FALSE-decision as described in connection with FIG. 2. Only in the worst case, all sets of parameter values to be verified have to be calculated in the calculating step (20) of the signature verification mode.

The sequence of the sets of parameter values which are calculated and compared one after the other depends primarily on the application in which the signature verification system is used. Furthermore, the sequence may be selected depending on e.g. the expressiveness of the respective parameters. In general, the sequence is selected in the aspect of a best compromise in short calculation-time, low data-rate and high reliability of the signature verification system.

Figure 3:
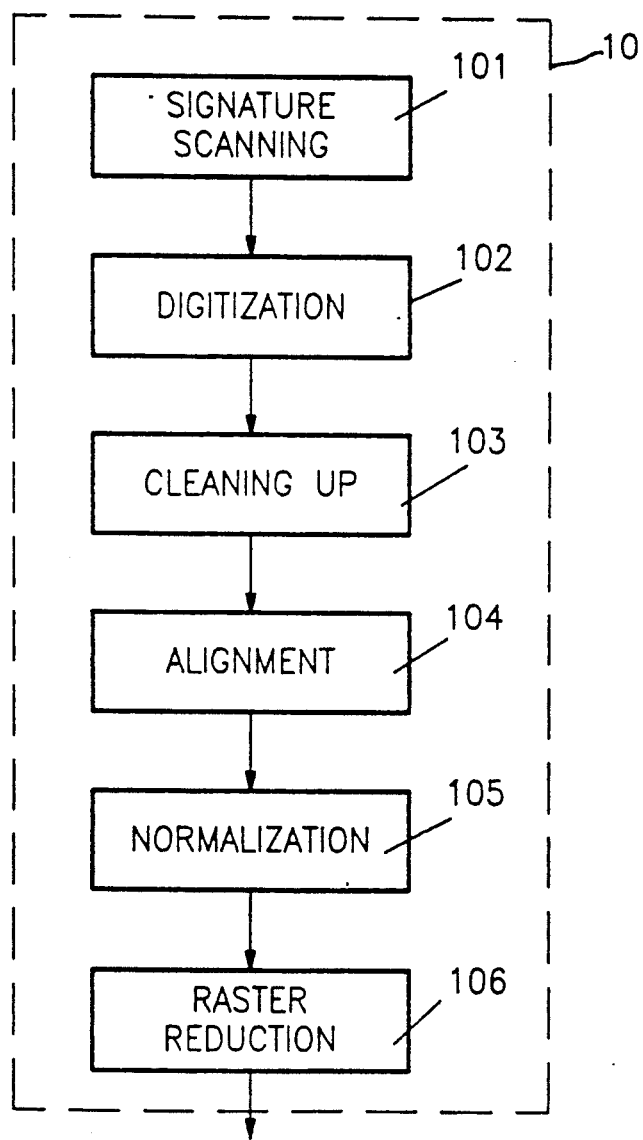
FIG. 3 is a more detailed block diagram of the signature input step of the block diagram of FIG. 1.

With respect to the block diagram of FIG. 3 the signature input (10) will now be described in further detail.

As already mentioned above, the signature input (10) is performed with a scanner or the like. This is done in a signature scanning step (101). In a following step (102) the scanned image is digitized.

In a next step (103), the digitized image is cleaned up. This means that all small points or dots which have been scanned and digitized due to dirt or other particles in the surroundings of the signature are eliminated in the digital image for example by bringing the picture elements in question into line with the picture elements in the neighborhood. This cleaning up step (103) restricts the digital image exactly to the signature and prevents the possibility of a faulty calculation of reference parameter values or parameter values to be verified.

In a further alignment step (104), the angle of the signature is aligned with respect to a given axis, for example with respect to a x- and a y-coordinate.

This alignment step (104) is followed by a normalization step (105) in which the size of the picture elements, respectively, is enlarged until the signature fills up a given size of the two dimensional array of the digital image. In FIG. 4a, as an example, the signature has been aligned and the picture elements have been enlarged so that the signature ("Joel") fills up the size of the whole array.

Finally, the signature input (10) includes a raster reduction step (106) in which the signature is scaled down by combining adjacent picture elements and thus decreasing the number of scaled down picture elements which represent the signature. The size of the signature in the array remains the same. As an example, the raster of the two dimensional array could be reduced to 20 scaled down picture elements in the direction of the x-coordinate and 10 scaled down picture elements in the y-coordinate.

Especially the cleaning up step (103), the alignment step (104), the normalization step (105) and the raster reduction step (106) are optional. Of course, if one or more of these steps is used in connection with the calculation of reference parameter values, the same step or steps must be used in connection with the calculation of correspondent parameter values to be verified as well.

Furthermore, it is possible to establish a digital image of the signature with the help of other methods and apparatus than the described scanner, for example with a video camera or the like.

With respect to FIGS. 4a to 8c different possibilities of significant parameters will now be described in further detail.

A first possibility of significant parameters which can be used in the calculating steps (20, 20') are the positions of the centers-of-gravity of the densities per column or per row and other related parameters which will be described now in connection with FIGS. 4a to 4c.

As already mentioned, the digital image of the signature contains a number of picture elements (pixels). In FIG. 4a the signature "Joel" is written in a rectangular two dimensional array which has n picture elements in its x-coordinate (i=1 to i=n) and m picture elements in its y-coordinate (j=1 to j=m). Of course, the picture elements are much smaller than are shown in FIG. 4a. Every picture element has one out of 256 values which cover a range from black to white with all greyscale-values inbetween. This greyscale-value of a picture element is the density of the respective picture element.

Figure 4B:
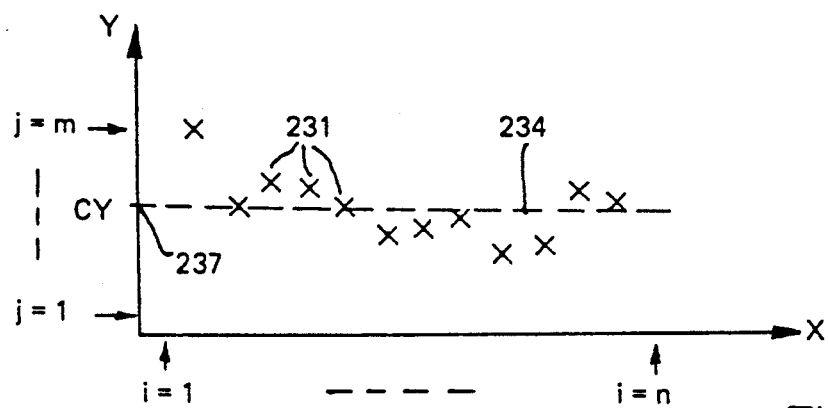
Figure 4C:
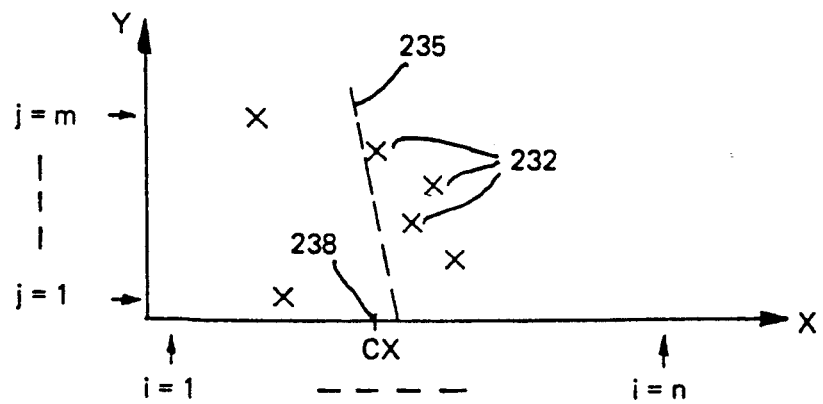

FIGS. 4b and 4c show two diagrams; FIG. 4b corresponds to the columns (i=1 to i=n) of the two dimensional array of FIG. 4a and FIG. 4c corresponds to the rows (j=1 to j=m) of the array of FIG. 4a.

The positions of the centers-of-gravity of all densities per column or per row are calculated as follows. If the density of the picture element (i,j) is densij and if the center-of-gravity of all densities of the column (i) is gravxi, then the following equation is defined:

$$\mathrm{grav}xi = \frac{\sum_{j=1}^{m} j \cdot \mathrm{dens}ij}{\sum_{j=1}^{m} \mathrm{dens}ij}.$$

For the center-of-gravity of all densities of the row (j), the following correspondent equation is defined:

$$\mathrm{grav}yj = \frac{\sum_{i=1}^{n} i \cdot \mathrm{dens}ij}{\sum_{i=1}^{n} \mathrm{dens}ij}.$$

Then, the positions of these centers-of-gravity (gravxi, gravyj) are evaluated for all columns (i=1 to i=n) and for all rows (j=1 to j=m).

In FIG. 4b, the positions (231) of the centers-of-gravity (gravxi) of all densities per column are entered for all columns (i=1 to i=n), whereas in FIG. 4c, the positions (232) of the centers-of-gravity (gravyj) of all densities per row are entered for all rows (j=1 to j=m). These positions (231, 232) can be used as sets of parameter values of the signature "Joel".

By means of liner regression, so-called gravity lines (234, 235) for the columns and for the rows can be calculated depending on the positions (231, 232) of the centers-of-gravity of the densities per column and per row. Of course, other ways of calculating these gravity lines (234, 235) can also be used.

These gravity lines (234, 235) for the columns and the rows can be described with the following equations:

$gravx = A.x + B$ and $gravy = C.y + D.$

The values of A, B, C and D can be used as sets of parameter values of the signature "Joel".

With the above mentioned positions (231, 232) again being the starting point, the position of a gravity-center (237, 238) can be calculated. The y-coordinate cy (237) of the-gravity center is the mean value of all positions (231) of the centers-of-gravity of the columns. The x-coordinate cx (238) is the mean value of all positions (232) of the centers-of-gravity of the rows.

Accordingly, the position of the gravity-center (237, 238) can be calculated as follows:

$$cy = \sum_{i=1}^{n} \frac{gravxi}{n}$$

$$cx = \sum_{i=1}^{n} \frac{gravyi}{n}.$$

The values of cy and cx can be used as a set of parameter values of the signature "Joel".

The position of the gravity-center (237, 238) is a very expressive parameter. For that reason, this position can be used as the first parameter (parameter-number 1) to be selected in the calculating step (20) of the signature verification mode.

A second possibility of significant parameters which can be used in the calculating steps (20, 20') are the positions of the maximum values of the densities per column or per row and other related parameters which will be described now in connection with FIGS. 5a to 5c.

Figure 5A:
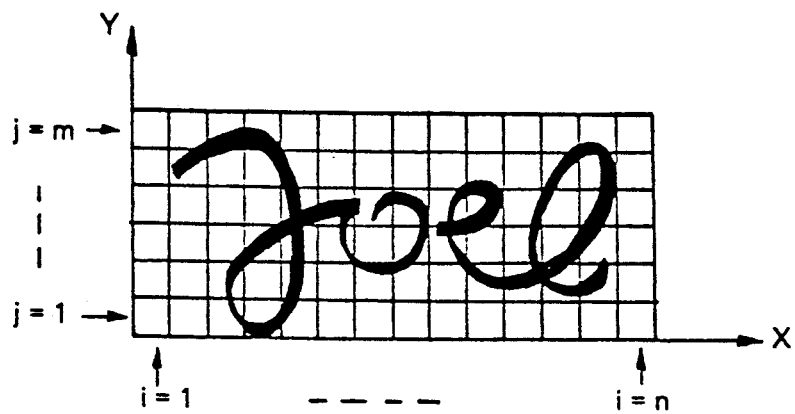
FIGS. 5a to 5c show a signature and one respective diagram per column and per row with the positions of the maximum values of the greyscale-values of the picture elements of the signature.

FIG. 5a corresponds to FIG. 4a and its accompanying description above. FIGS. 5b and 5c show two diagrams; FIG. 5b corresponds to the columns (i=1 to i=n) of the two dimensional array of FIG. 5a and FIG. 5c corresponds to the rows (j=1 to j=m) of the array of FIG. 5a.

The positions of the maximum values of the densities per column or per row are calculated as follows. If the density of the picture element (i,j) is densij and if the maximum value of all densities of the column (i) is maxxi, the following equation is defined:

$$maxxi = \text{MAXIMUM}_{j=1}^{m} densij.$$

For the maximum value of all densities of the row (j), the following correspondent equation is defined:

$$maxyj = \text{MAXIMUM}_{i=1}^{n} densij.$$

Then, the positions of these maximum values (maxxi, maxyj) are evaluated for all columns (i=1 to i=n) and all rows (j=1 to j=m).

Figure 5B:
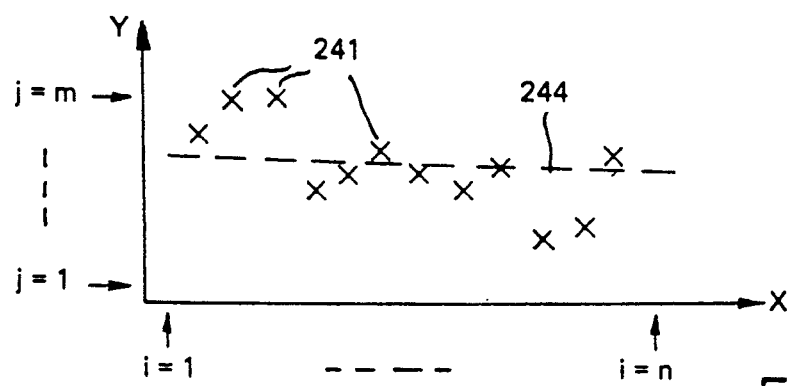
Figure 5C:
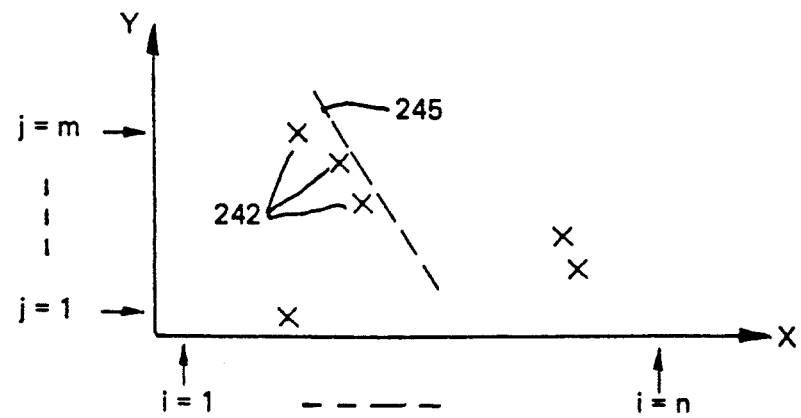

In FIG. 5b, the positions (241) of the maximum values (maxxi) of all densities per column are entered for all columns (i=1 to i=n), whereas in FIG. 5c, the positions (242) of the maximum values (maxyj) of all densities per row are entered for all rows (j=1 to j=m), These positions (241, 242) can be used as sets of parameter values of the signature "Joel".

By means of linear regression, so-called maximum lines (244, 245) for the columns and for the rows can be calculated depending on the positions (241, 242) of the maximum values of the densities per column and per row. Of course, other ways of calculating these maximum lines (244, 245) can also be used.

These maximum lines (244, 245) for the columns and the rows can be described with the following equations:

$$maxx = E.x + F \text{ and}$$

$$maxy = G.y + H.$$

The values of E, F, G and H can be used as sets of parameter values of the signature "Joel".

A third possibility of significant parameters which can be used in the calculating steps (20, 20') are sum values of the densities per column or per row and other related parameters which will be described now in connection with FIGS. 6a to 6c.

Figure 6A:
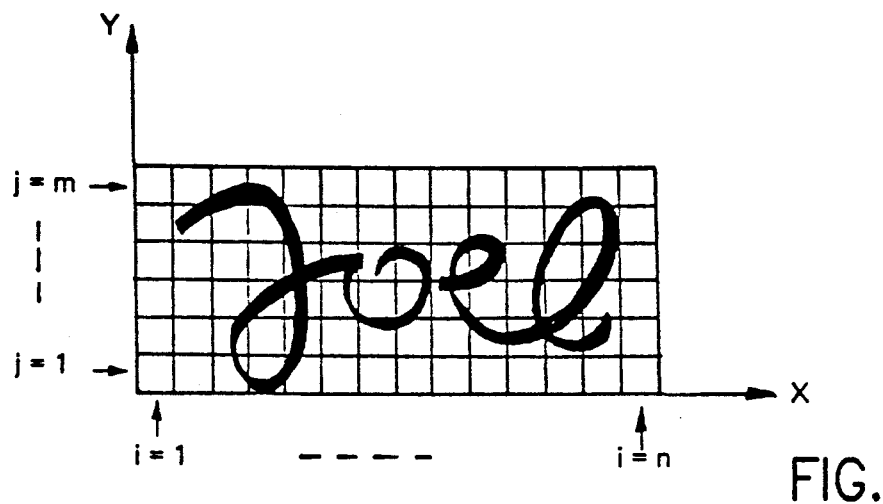
FIGS. 6a to 6c show a signature and one respective diagram per column and per row with the positions of the sum values of the greyscale-values of the picture elements of the signature.

FIG. 6a corresponds to FIG. 4a and its accompanying description above. FIGS. 6b and 6c show two diagrams; FIG. 6b corresponds to the columns (i=1 to i=n) of the two dimensional array of FIG. 6a and FIG. 6c corresponds to the rows (j=1 t ,o j=m) of the array of FIG. 6a. Unlike FIGS. 4b, 4c, 5b and 5c, where both coordinates relate to position-values, one coordinate of FIGS. 6b and 6c does not relate to position-values but to sum values of densities.

The sum values of the densities per column or per row are calculated as follows. If the density of the picture element (i,j) is denslj and if the sum value of all densities of the column (i) is sumxi, then the following equation is defined:

$$sumxi = \sum_{j=1}^{m} densij.$$

For the sum values of all densities of the row (j), the following corresponding equation is defined:

$$sumyj = \sum_{i=1}^{n} densij.$$

Figure 6B:
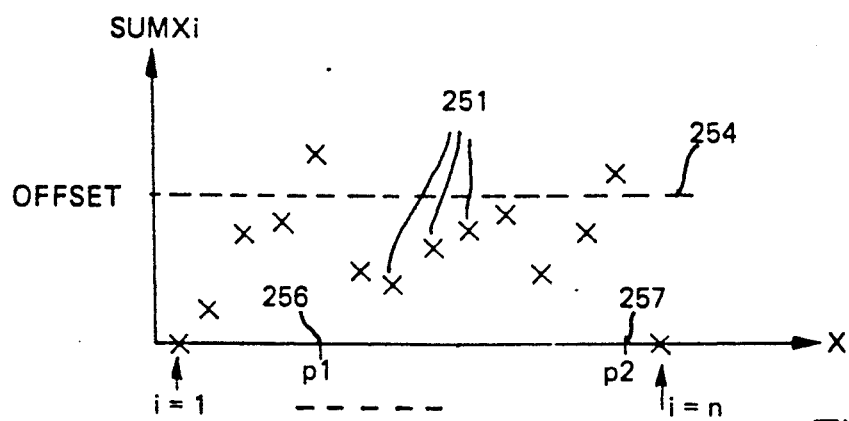
Figure 6C:
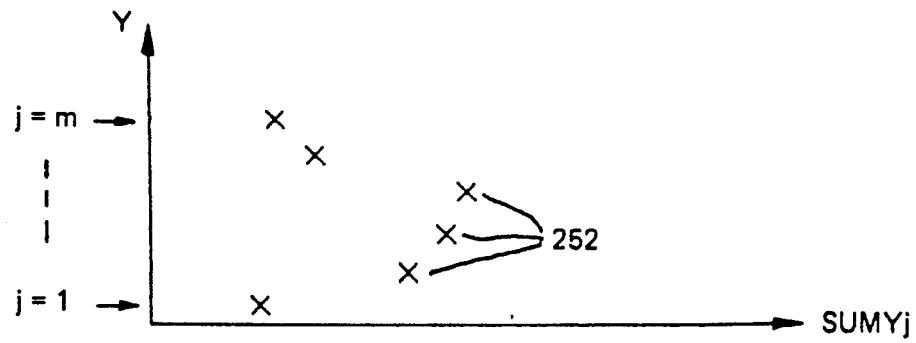

In FIG. 6b, the sum values (251) of all densities per column are entered for all columns (i=1 to i=n), whereas in FIG. 6c, the sum values (252) of all densities per row are entered for all rows (j=1 to j=m). These sum values (251, 252) can be used as sets of parameter values of the signature "Joel".

Another significant parameter of the signature "Joel" is the number how often one of the sum values of the densities per column is greater than a given offset sum. This number is called the x-sum number. In FIG. 6b, the offset sum is denoted with the reference sign (254) and the x-sum number is 2.

The position or the positions of these sum values of the columns which are greater than the given offset sum (254) are further significant parameters of the signature. These positions are called x-sum positions. In FIG. 6b, the x-sum positions are denoted with p1 (256) and p2 (257).

The x-sum number and the x-sum positions can be used as further sets of parameter values of the signature "Joel".

Of course, it is possible to create corresponding y-sum numbers and y-sum positions.

Further possibilities of significant parameters which can be used in the calculating steps (20, 20') are the line width or the envelope of the signature which will be described now in connection with FIGS. 7a to 7c.

Figure 7A:
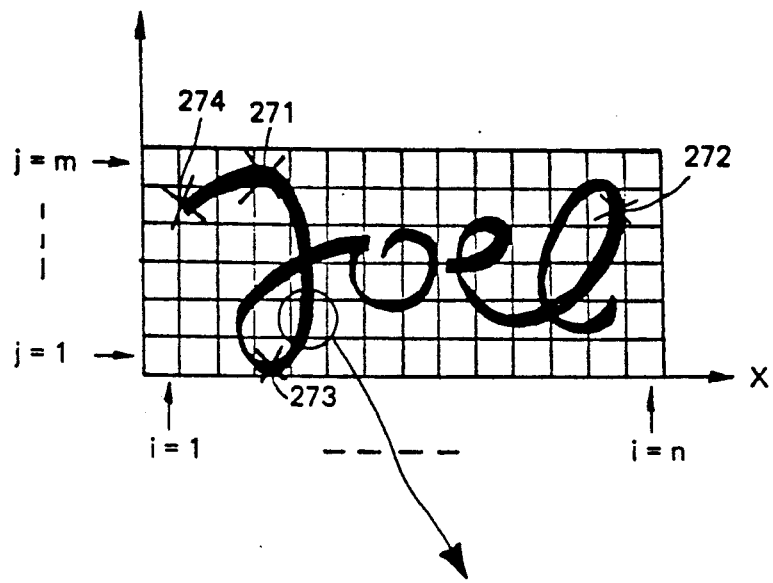
FIGS. 7a to 7c show a signature, its line-width and its envelope.
Figure 7B:
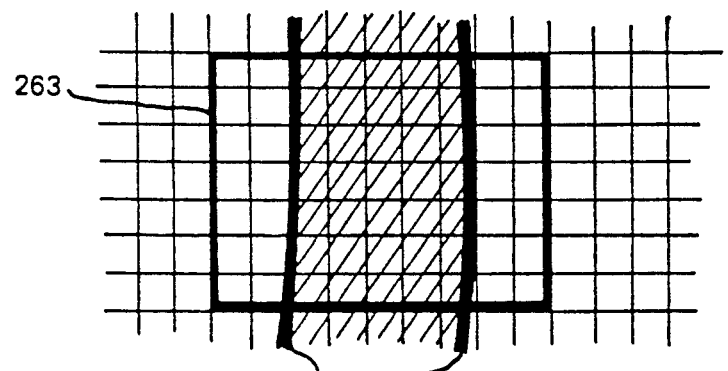
Figure 7C:
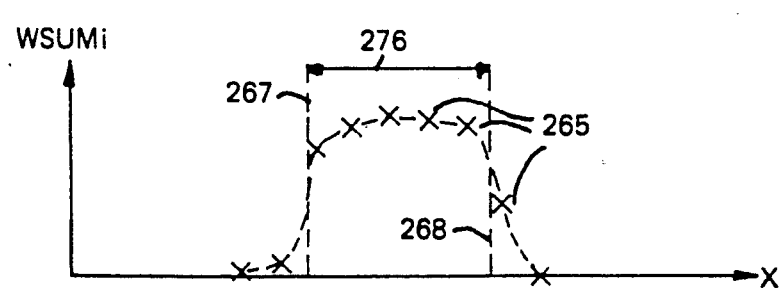

FIGS. 7a to 7c show a signature, its line-width and its envelope.

FIG. 7a corresponds to FIG. 4a and its accompanying description above.

FIG. 7b shows a part of the two dimensional array of FIG. 7a in an increased size. This part contains a line-section of the signature "Joel". The correlation between FIGS. 7a and 7b is indicated by the arrow which points from FIG. 7a to FIG. 7b. The edges of the line-section are denoted with the reference sign (261). The line-section of the signature shown in FIG. 7b is surrounded by a rectangle (263).

FIG. 7c shows a diagram which corresponds to the columns in the rectangle (263) of the array of FIG. 7b. Unlike FIGS. 4b, 4c, 5b and 5c, where both coordinates relate to position-values, one coordinate of FIG. 7c does not relate to position-values but to sum values of densities.

The following calculations only relate to the picture elements inside of the rectangle (263).

If the density of the picture element (i,j) is densij and if the sum value of all densities of the column (i) is wsumi, then the following equation is valid:

$$wsumi = \sum_j densij.$$

In FIG. 7c, the sum values (265) of all densities per column are entered for all columns of the rectangle (263). If these sum values (265) are connected by lines, the originating curve has two turning points (267, 268). The distance between the two turning points in the direction of the x-coordinate corresponds to the line width (276) of the signature.

This value of the line-width (276) can be used as a set of parameter values of the signature "Joel".

The reference signs (271, 272, 273 and 274) in FIG. 7a characterize those positions of the signature which have an extreme value in one of the four orthogonal directions of the two dimensional array. For example, the position (272) has the greatest value in the direction of the x-coordinate. These extreme values form an envelope of the signature when lines are drawn through them which are parallel to the x- and the y-coordinate.

The values (271, 272, 273 and 274) of this envelope can be used as a set of parameter values of the signature "Joel".

Further possibilities of significant parameters which can be used in the calculating steps (20, 20') are bows which represent a segment of the signature and which will be described now in connection with FIGS. 8a to 8c.

Figure 8A:
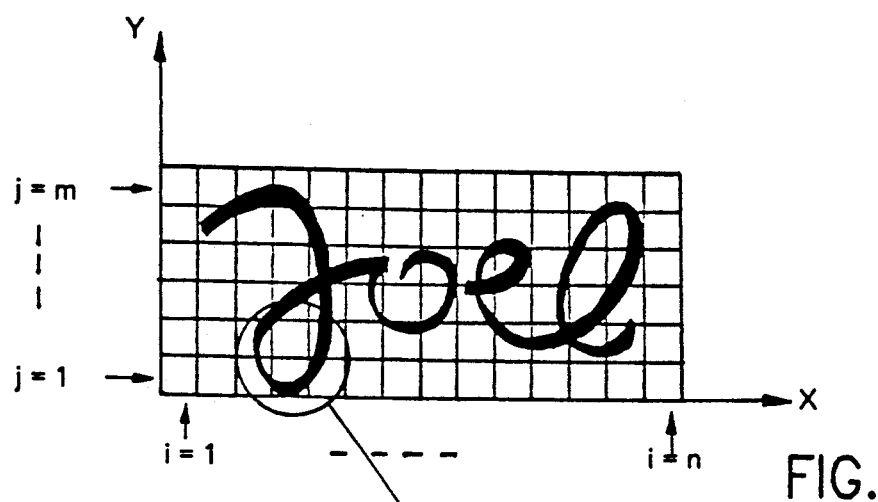
FIGS. 8a to 8c show a signature, one of its bows and the segmentation of this bow.
Figure 8B:
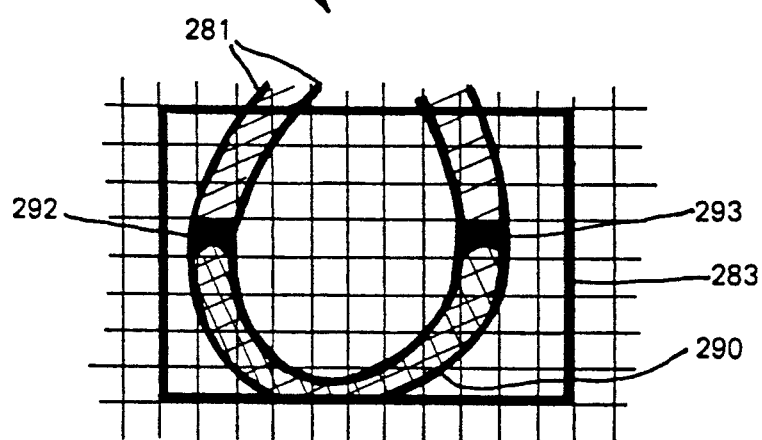
Figure 8C:
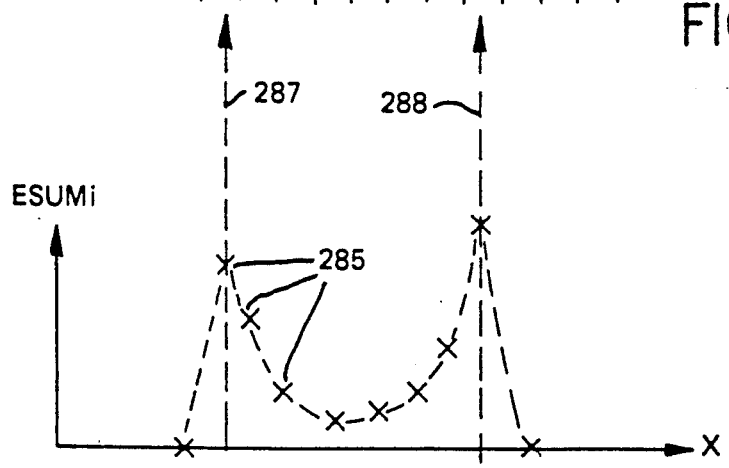

FIGS. 8a to 8c show a signature, one of its bows and the segmentation of this bow.

FIG. 8a corresponds to FIG. 4a and its accompanying description above.

FIG. 8b shows a part of the two dimensional array of FIG. 8a in an increased size. This part contains a bow-section of the signature "Joel". The correlation between FIGS. 8a and 8b is indicated by the arrow which points from FIG. 8a to FIG. 8b. The edges of the bow-section are denoted with the reference sign (281). The bow-section of the signature shown in FIG. 8b is surrounded by a rectangle (283).

FIG. 8c shows a diagram which corresponds to the columns in the rectangle (283) of the array of FIG. 8b. Unlike FIGS. 4b, 4c, 5b and 5c, where both coordinates relate to position-values, one coordinate of FIG. 8c does not relate to position-values but to sum values of densities.

The following calculations only relate to the picture elements inside of this rectangle (283).

If the density of the picture element (i,j) is densij and if the sum value of all densities of the column (i) is esumi, then the following equation is defined:

$$esumi = \sum_j densij.$$

In FIG. 8c, the sum values (285) of all densities per column are entered for all columns of the rectangle (283). If these sum values (285) are connected by lines, the originating curve has two extreme points (287, 288) which define ending points (292, 293) of a segment (290) of the bow as shown in FIG. 8b. The correlation between the extreme points (287, 288) and these ending points (292, 293) is indicated by the two arrows which point from FIG. 8c to FIG. 8b.

The segment (290) of the bow shown in FIG. 8b is now replaced by a second order polynomial.

A second order polynomial can generally be described in the form of the following equation:

$$y = a + b.x + c.x^2.$$

This polynomial forms a parabola. Another way to describe a second order polynomial is to pick out three points of the parabola: x1, y1; x2, y2; x3, y3. Having these three points, it is possible to calculate the values of a, b and c of the above mentioned equation of the polynomial.

The first and the second point of the parabola (x1, y1; x2, y2) are the two ending points (292, 293) of the bow-segment shown in FIG. 8b. The third point (x3, y3) is calculated depending on all other points of the bow segment (290) shown in FIG. 8b. This third point (x3, y3) is calculated in such a way that the parabola which corresponds to the calculated second order polynomial matches with the bow-segment (290) shown in FIG. 8b in as many points as possible. For this calculation the methods of parabola regression are used, especially the method of Gauss and/or the method of Cramer.

The whole signature is divided or cut into a number of segments which represent unique pieces of the signature. Then all these segments are analyzed and replaced by the two ending points of the segments and one calculated third point, respectively, as it is described above.

The respective three points of all segments can be used as sets of parameter values of the signature "Joel".

The use of all these significant parameters in the calculating step (20, 20') is optional. It is possible to use all parameters or only some distinct ones. It is also possible to calculate all sets of reference parameter values, but to calculate only some of the corresponding sets of parameter values to be verified. In this case, only the calculated sets of parameter values to be verified are compared with the corresponding sets of reference parameter values.

Furthermore, it is possible to calculate these sets of parameter values in parallel, that means for example to use several microprocessors which process different parameter values simultaneously (parallel-processing).

Another possibility is to use one or more of the above mentioned parameters for a preselection. A preselection means that in the signature verification mode the selected parameter for preselection is the first parameter to be calculated (20) and compared (22). Then, the verification step (23) is carried out and if this step carries out a FALSE-decision then the signature to be verified is rejected at once. If the verification step (23) carries out a TRUE-decision then the procedure is continued with the calculations as already described. By that, processing time can be saved.

The described image verification system can especially be used in banking systems where all sets of reference parameter values of the reference signature are stored in a central computing system and where decentralized computers in banks at different places calculate the sets of parameter values to be verified out of a present signature, receive the corresponding sets of parameter values via a connecting line from the central computing system and then compare the sets of parameter values to be verified with the sets of reference parameter values and accept or reject the present signature to be verified. The whole signature verification system works automatically without any intervention of a human being. Furthermore, the system works very fast and is very flexible for adaption for example to different banking systems.

In a modified version the described system can be used in connection with text analysis or character recognition and in connection with computer implemented manufacturing. In the first case, the characters of the alphabet, and in the other case, the parts to be manufactured correspond to the reference signatures. In both cases, the significant parameters of the characters or of the parts to be manufactured are calculated and stored and then compared with the characters or parts to be verified.

We claim:

1. A method for automatically verifying a person's signature on a check or other document, said method comprising the steps of:
   storing in a memory one or more references defining one or more respective characteristics of a value signature of said person;
   digitizing an image of the signature to be verified, the digitized image representing grey scale levels of a multiplicity of image elements;
   using a computer system, determining a center of gravity line in a direction for the digitized image by determining a plurality of centers of gravity of the pixels perpendicular to said direction at respective spaced locations in said direction using the grey scale levels as weighting factors for the respective pixels, and then determining said center of gravity line based on said plurality of centers of gravity;
   using a computer system, comparing said center of gravity line to said one or more stored references for the valid signature; and
   using a computer system, determining validity of the signature to be verified based on the comparing step; and
   if said signature is determined to be invalid, rejecting said check or other document, and
   if said signature is determined to be valid, accepting said check or other document.

2. The method of claim 1 wherein said center of gravity line is determined by linear regression of said plurality of centers of gravity.

3. The method of claim 1 further comprising the step of digitizing an image of said valid signature for storage in said memory.

4. The method of claim 1 wherein said one or more references are based on a valid signature that is aligned with a horizontal line and further comprising the step of aligning the digitized image of said signature to be verified with a horizontal line.

5. The method of claim 1 wherein
   the stored reference is scaled to a reference size of said valid signature; and
   the digitizing step comprises the step of normalizing the digitized image with respect to the reference size of said valid signature.

6. The method of claim 1 wherein
   the step of determining a center of gravity line comprises the step of determining each of said centers of gravity based on a pixel along a line perpendicular to said direction and passing through the respective spaced location, said pixel having a maximum grey scale level along said line.

7. Apparatus for verifying a person's signature on a check or other document, said apparatus comprising:
   means for storing one or more references defining one or more respective characteristics for a valid signature of said person;
   means for digitizing an image of the signature to be verified, the digitized image representing grey scale levels of a multiplicity of pixels;
   means for determining a center of gravity line in a direction for the image by determining a plurality of centers of gravity of the pixels perpendicular to said direction at respective spaced locations in said direction using the grey scale levels as weighting factors for the respective pixels, and then determining said center of gravity line based on said plurality of centers of gravity; and
   means for comparing said center of gravity line to corresponding reference(s) for the valid signature to determine if said signature is valid, and
   if said signature is determined to be invalid, rejecting said check or other document, and
   if said signature is determined to be valid, accepting said check or other document.

8. Apparatus as set forth in claim 7 wherein said center of gravity line is determined by linear regression of said plurality of centers of gravity.

9. Apparatus as set forth in claim 7 further comprising means for aligning said digitized image with a horizontal reference.

10. Apparatus as set forth in claim 7 wherein each of said plurality of centers of gravity is based on substantially all pixels along a respective line perpendicular to said direction and passing through the respective spaced location.

11. The method of claim 1 further comprising the steps of:
    determining a position of a pixel having a maximum grey scale value for each of a plurality of parallel lines through said image;
    comparing said positions of the maximum grey scale pixels for said plurality of lines to corresponding reference(s) for the valid signature; and
    using a computer system, determining validity of the signature to be verified based on the comparison of said positions of the maximum grey scale pixels.

12. The method of claim 1 wherein each of said plurality of centers of gravity is based on substantially all pixels along a respective line perpendicular to said direction and passing through the respective spaced location.

13. The method of claim 11 further comprising the step of aligning the digitized image of said signature with a horizontal reference.

14. The method of claim 11 further comprising the step of normalizing the digitized image with respect to a size of said valid signature.

15. The method of claim 11 wherein the position determining step comprises the step of calculating said maximum grey scale values for each column or row of the digitized image.

16. Apparatus as set forth in claim 7 further comprising:
   means for determining a position of a pixel having a maximum grey scale value for each of a plurality of parallel lines through said image; and
   means for comparing said positions of the maximum grey scale pixels for said plurality of lines to corresponding reference(s) for the valid signature to determine if the signature to be verified is valid.

17. Apparatus as set forth in claim 16 further comprising means for aligning the digitized image of said signature with a horizontal reference.

18. Apparatus as set forth in claim 16 wherein the determining means determines the maximum gray scale value for each column and row of the digitized image.

19. A method as set forth in claim 1 further comprising the steps of:
   determining sums of grey scale levels for pixels in each of a plurality of rows or columns;
   comparing said sums to corresponding references for the valid signature; and
   determining validity of the signature to be verified based on the comparison of said sums.

20. The method of claim 19 further comprising the step of digitizing an image of said valid signature for storage in said memory.

21. The method of claim 19 further comprising the step of aligning the digitized image with respect to a horizontal reference.

22. The method of claim 19 wherein only the sums which exceed a threshold are compared to the corresponding reference.

23. Apparatus as set forth in claim 7 further comprising:
   means for determining sums of grey scale levels for pixels in each of a plurality of rows or columns; and
   means for comparing said sums to corresponding references for the valid signature; and
   means for determining validity of the signature to be verified based on the comparison of said sums.

24. Apparatus for verifying a person's signature on a check or other document, said apparatus comprising:
   means for storing one or more references defining one or more respective characteristics of a valid signature for said person;
   means for digitizing an image of the signature to be verified, the digitized image representing a multiplicity of image elements (pixels);
   means for representing a shape of a bow within the digitized image of said signature with an equation of at least second order which approximates said bow;
   means for comparing the representation of said shape of said bow to the reference for the valid signature; and
   means for determining validity of the signature to be verified based on the comparison; and
      if said signature is determined to be invalid, rejecting said check or other document, and
      if said signature is determined to be valid, accepting said check or other document.

25. Apparatus as set forth in claim 24 wherein the representing means determined sums of pixels within each of a plurality of columns or rows through said bow, identified two peaks of said sums within the rows or two peaks of said sums within the columns, and uses said two peaks as points on a curve defined by said second order equation.

26. Apparatus as set forth in claim 24 wherein the representing means determines positions of extreme left and right pixels of said bow.

27. Apparatus as set forth in claim 24 wherein the digitizing means determines a grey scale level for each of said pixels, and the representing means determines a shape of said bow by summing grey scale levels of pixels in each column of pixels of said bow.

* * * * *